United States Patent
Davis-Hoover et al.

(10) Patent No.: US 7,252,986 B2
(45) Date of Patent: Aug. 7, 2007

(54) PROCESS FOR THE BIODEGRADATION OF HYDROCARBONS AND ETHERS IN SUBSURFACE SOIL BY INTRODUCTION OF A SOLID OXYGEN SOURCE BY HYDRAULIC FRACTURING

(75) Inventors: Wendy Jo Davis-Hoover, Wyoming, OH (US); Stephen J. Vesper, Kettering, OH (US)

(73) Assignee: U. S. Environmental Protection Agency, Washington, DC (US)

( * ) Notice: Subject to any disclaimer, the term of this patent is extended or adjusted under 35 U.S.C. 154(b) by 572 days.

(21) Appl. No.: 10/395,893

(22) Filed: Mar. 25, 2003

(65) Prior Publication Data

US 2003/0203475 A1    Oct. 30, 2003

Related U.S. Application Data

(60) Provisional application No. 60/367,763, filed on Mar. 28, 2002, provisional application No. 60/367,200, filed on Mar. 26, 2002.

(51) Int. Cl.
*C12S 13/00* (2006.01)
(52) U.S. Cl. .............. 435/262.5; 405/128.5; 210/610; 210/747; 166/246
(58) Field of Classification Search ............. 435/262.5; 210/747; 166/246; 405/128.45, 128.5
See application file for complete search history.

(56) References Cited

U.S. PATENT DOCUMENTS 5,264,018 A * 11/1993 Koenigsberg et al. ......... 71/63
5,733,067 A * 3/1998 Hunt et al. .............. 405/128.5

OTHER PUBLICATIONS

Fischer et al. "BTEX/TVPH remediation using an oxygen release compound." International In Situ and On-Site Bioremediation Symposium, Jun. 4-7, 2001, vol. 10, 15-22.*

Vesper et al, "Solid oxygen source for bioremediation in subsrface soils", Journal of Hazardous Materials, 36 (1994), pp. 265-274.

Heitkamp, Michael A., "Effects of Oxygen-Releasing Materials on Aerobic Bacterial Degradation Processes", Bioremediation Journal (2):105-114 (1997).

Davis-Hoover et al, "Hydraulic Fracturing to Improve Nutrient and Oxygen Delivery for In Situ Bioreclamation", pp. 67-82, In-Situ Bioreclamation, Robert E. Hinchee and Robert F. Olfenbuttel, Editors, (Butterworth-Heinemann 1991).

Fischer et al, "BTEX/TVPH Remediation Using an Oxygen Release Compound" International In Situ and On-Site Bioremediation Symposium, Jun. 4-7, 2001, vol. 10, pp. 15-22.

* cited by examiner

*Primary Examiner*—William H. Beisner
(74) *Attorney, Agent, or Firm*—George A. Loud, Esq.; Bacon & Thomas, PLLC

(57) ABSTRACT

A bioremediation of subsurface soil formations contaminated with hazardous wastes is achieved by hydraulic fracturing of the subsurface soil formation with simultaneous introduction of sodium percarbonate coated with polyvinylidene chloride as a solid oxygen source (SOS) for establishing colonies of the biodegrading bacteria within the fractures of the soil formation.

11 Claims, 6 Drawing Sheets

PROCESS FOR THE BIODEGRADATION OF HYDROCARBONS AND ETHERS IN SUBSURFACE SOIL BY INTRODUCTION OF A SOLID OXYGEN SOURCE BY HYDRAULIC FRACTURING

This application claims benefit of prior filed provisional application No. 60/367,763 filed Mar. 28, 2002 and provisional application No. 60/367,200 filed Mar. 26, 2002.

BACKGROUND OF THE INVENTION

1. Field of Invention

Bioremediation of BTEX, MTBE and other hydrocarbon and ether contaminants in subsurface soil.

2. The Prior Art

BTEX (benzene, toluene, ethylbenzene and xylenes) and MTBE (methyltertiarybutyl-ether) are gasoline components/additives known to be injurious to human health. They have been found to enter the water supply, for example, by leakage from underground gasoline storage tanks.

The use of "bionets" to destroy contaminants in ground water and subsurface rock and soil formations is known. A "bionet" is a subsurface zone containing microorganisms known to biodegrade the contaminants. A bionet is formed by inoculation of the microorganism into a well or subsurface zone or by creating an environment within a well or subsurface zone where such microorganisms, native to the site, will proliferate and effectively degrade the contaminant.

One prior art approach to formation of a bionet in a subsurface formation involves the use of hydraulic fracturing. See: W. J. Davis-Hoover, L. C. Murdoch, S. J. Vesper, H. R. Pahren, O. L. Sprockel. C. L. Chang, A. Hussain and W. A. Ritschel. "Hydraulic Fracturing to Improve Nutrient and Oxygen Delivery for In Situ Bioreclamation," in: R. E. Hinchee and R. F Olfenbuttel (Eds.), *In Situ Bioreclamation Applications and Investigations for Hydrocarbon and Contaminated Site Remediation*, Butterworth-Heinemann, Stoneham, Mass., 1992, pp. 67-82.

The process of hydraulic fracturing at a well begins with the injection of fluid into the well, typically using a constant rate pump. The pressure of the fluid increases until it exceeds a critical value and a fracture is nucleated. A proppant is simultaneously pumped into the fracture as the fracture grows away from the well. Transport of proppant may be facilitated by using a viscous fluid, usually a gel formed from guar gum and water, to carry the proppant grains into the fracture. After pumping, the proppant holds the fracture open while the viscous gel breaks down into a thin fluid. The thinned gel is then pumped out of the fracture, leaving a layer of proppant grains in the subsurface. Hydraulic fracturing is one of the few techniques capable of placing substantial masses of solid compounds in the subsurface. Fractures containing hundreds of kilos of material have been created within a few meters of the ground surface, and much bigger fractures are certainly possible. Stacking flat-lying fractures offers the possibility of dissecting a contaminated site with closely spaced reservoirs of nutrients and oxygen.

In the prior art attempts to apply hydraulic fracturing in formation of bionets, oxygen has been the most important limiting factor. The introduction of oxygen into soil for bioremediation has traditionally been based on pumping oxygenated water or air into the soil. Both of these methods have significant limitations. For example, oxygen has a very limited solubility in water (about 8 PPM) and the lower the temperature of the water, the lower the solubility. This low oxygen carrying capacity of water means that great volumes of water need to be constantly added to the soil. This creates problems for spreading the contaminants around at a site and potentially into neighboring soil or into subsurface water. Also, this process requires extensive surface pumps and meters which are prone to failure and freezing.

Pumping air into soil creates problems because the air flow is resisted in the soil by the water capillarity pressures. These tend to be the locations where the contaminants are trapped and thus the oxygen never gets to the microorganisms near the contaminant. Air introduction also requires extensive surface equipment susceptible to failure and continuous maintenance.

In the aforementioned paper by W. L. Davis-Hoover et al, the authors reported an attempt to overcome the above-described problems of oxygen introduction by use of a solid oxygen source (SOS) in laboratory simulation of hydraulic fracturing. More specifically, they report the results of tests using sodium percarbonate encapsulated with ethylcellulose. However, it was found that the encapsulated percarbonate was exhausted after 24 hours.

Subsequently, Vesper et al reported the results of tests designed to evaluate the effectiveness of encapsulated sodium percarbonate as a source of oxygen to support biodegradation, again under laboratory test conditions. More specifically, the SOS used in these reported experiments consisted of sodium percarbonate microencapsulated with polyvinylidene chloride (PVDC). This SOS was used to support gram-negative bacteria (Pseudomonas) in biodegradation of propylene glycol (PPG) serving as a surrogate contaminant. See Vesper, S. J., L. C. Murdoch, S. Hayes, and W. J. Davis-Hoover, 1994 "Solid Oxygen Source for Bioremediation in Subsurface Soils". *J. Hazardous Materials*, 36:265-274. However, the sodium percarbonate encapsulated with PVDC was found to become exhausted of its capability to supply oxygen in only a few weeks, thus suggesting only limited usefulness.

SUMMARY OF THE INVENTION

The present invention is a process for promoting long term biodegradation of BTEX, MTBE, and other hydrocarbon and ether wastes in subsurface soil using a defined slow release oxygen source, sodium percarbonate coated with PVDC, introduced into the subsurface soil using hydraulic fracturing which, if desired, can also carry a selected microbial population, nutrients, or other amendments needed to complete the bioremediation. The actual demonstration that the SOS oxygen release rate was reduced by at least a factor of ten when introduced by hydraulic fracturing into the subsurface was unexpected. The process is particularly applicable to contaminants derived from gasoline such as BTEX and MTBE.

Accordingly, the present invention provides a process for biodegradation of hydrocarbons and ethers, e.g., contaminants derived from gasoline, present in subsurface formations such as soil, consolidated soils and gravels and rock. As used herein, the term "soil" is intended to embrace all of the foregoing different types of subsurface formations. The process includes admixing a proppant, sodium percarbonate encapsulated with polyvinylidene chloride and water to form a slurry. The process further involves injecting the slurry into the subsurface soil at a hydraulic pressure sufficient to form fractures in the subsurface soil, the proppant serving to hold open the fractures. In this manner, the process succeeds in establishing colonies of bacteria within the fractures. The bacteria, preferably aerobic bacteria, have the capability of digesting and thereby degrading the hazardous wastes, with the encapsulated sodium percarbonate serving as a solid oxygen source for supplying oxygen to the bacteria.

The source of the bacteria may be either the bacteria native to the subsurface soil or bacteria added to the slurry prior to injection. In the case of reliance upon native bacteria, the establishment of an effective "bionet" for degradation of the contaminants, depending on the nature of the contaminant, may delay initiation of effective biodegradation for a period up to one year or so. Accordingly, it is preferred to add the bacteria to the slurry, for example, by inoculation of the proppant prior to formation of the slurry.

The process of the present invention is particularly directed to treatments of specific contaminants derived from gasoline, namely, BTEX (benzene, toluene, ethylbenezene, and xylenes) and methyl t-butyl ether (MTBE). "Xylenes", as used herein, is understood to include o-xylene, m-xylene and p-xylene.

In view of our prior reported findings based on laboratory tests wherein sodium percarbonate encapsulated with PVDC was found to become exhausted within several weeks, our field testing of this SOS in the biodegradation of MTBE and/or BTEX, specifically the finding that this SOS continued as a viable source of oxygen within the hydraulically fractured subsurface soil for up to 22 months, was totally unexpected. Accordingly, the present invention, in preferred embodiments thereof, introduces an additional amount of oxygen to the fractured subsurface soil at intervals of at least 1 month, preferably at least 10 months and at most preferably at least 20 months.

Nutrients, gel-forming agents, e.g., guar gum, and other additives conventionally used in hydraulic fracturing may also be added to the slurry, as needed.

In particular, the present invention offers numerous advantages including the following:

1. No surface devices, equipment, sheds etc are needed (and thus no maintenance) because this is a one time introduction of the SOS (and other amendments, if desired) with the hydraulic fracturing, although it can be reintroduced in the future.

2. There is no chance of contaminant spread because the process relies on the slow diffusion of oxygen from the SOS.

3. Introduction of the SOS deep into the subsurface make it practical for the slow release of the oxygen from the SOS and thus makes it practical for bioremediation.

4. Because microorganisms designed to most effectively degrade the contaminant and nutrients can be added at the time of hydraulic fracturing, the process assures the presence of the appropriate microorganisms and nutrients needed to complete bioremediation.

5. The PVDC encapsulated sodium percarbonate has a substantial shelf life (at least 6 years).

DESCRIPTION OF THE PREFERRED EMBODIMENTS

Solid Oxygen Source

Figure 1:
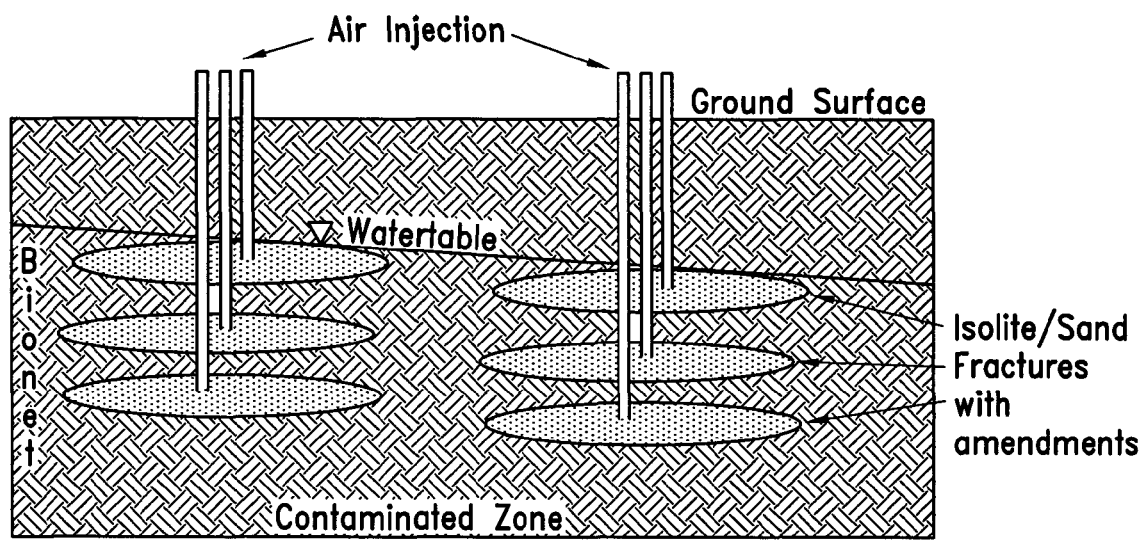
FIG. 1 is a schematic illustration of application of the present invention in the manner of the experimental testing described in the following.
Figure 2A:
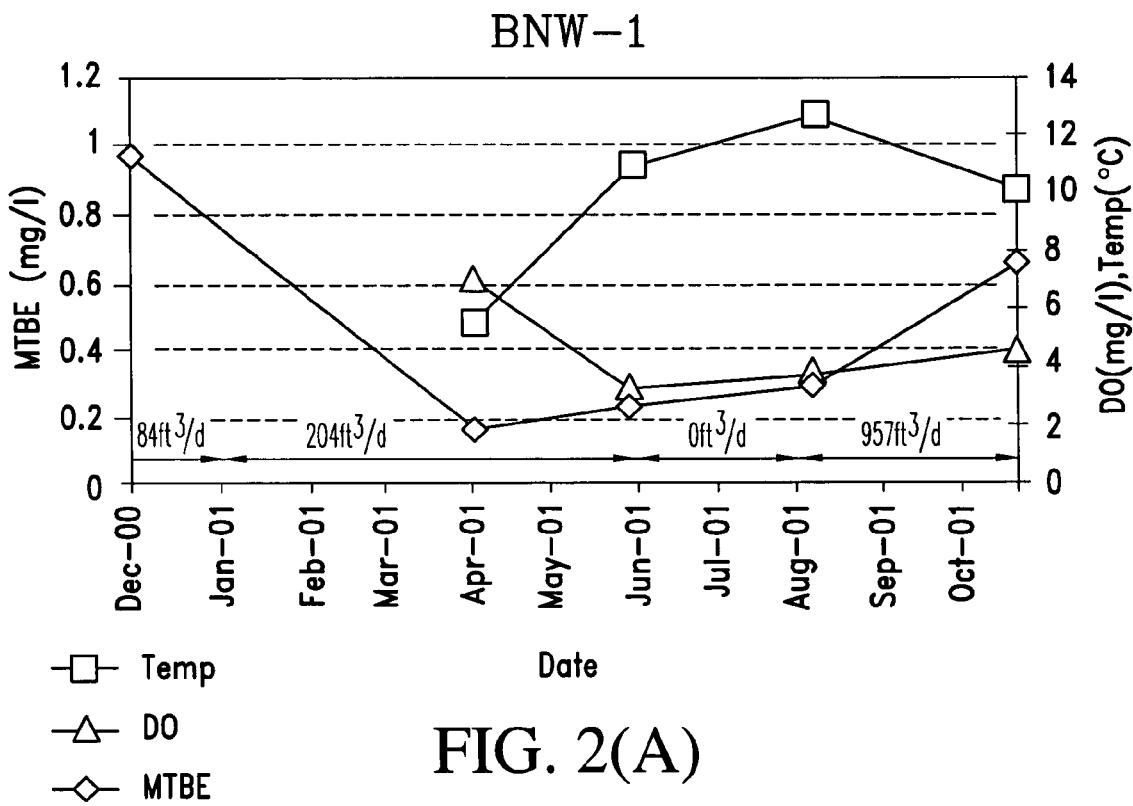
FIGS. 2(A)-2(D) are graphs of the reduction of concentrations of MTBE by biodegradation over time, as determined experimentally.
Figure 2B:
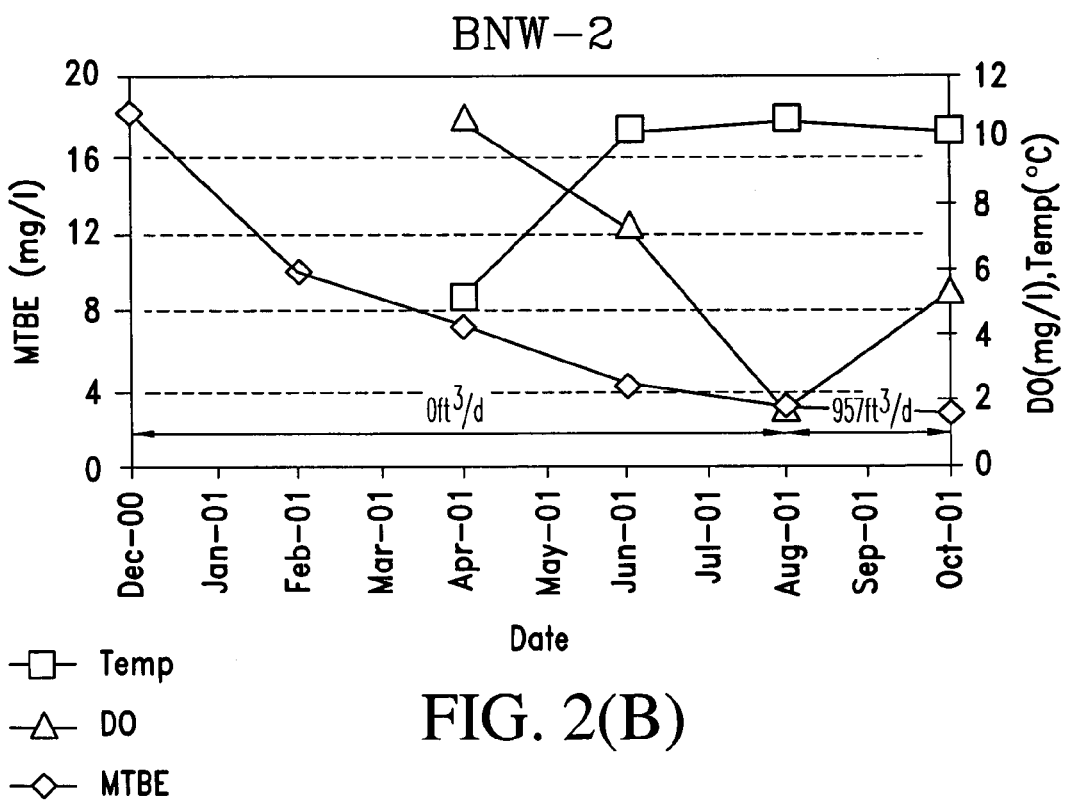
Figure 2C:
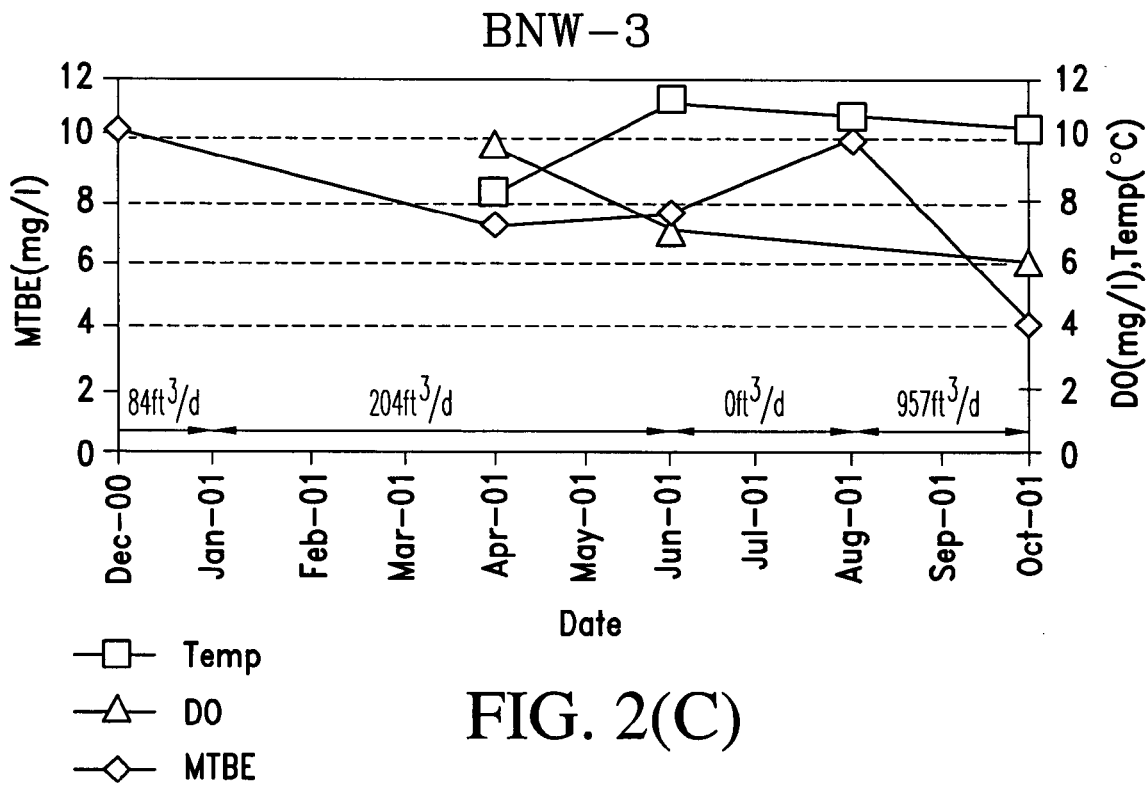
Figure 2D:
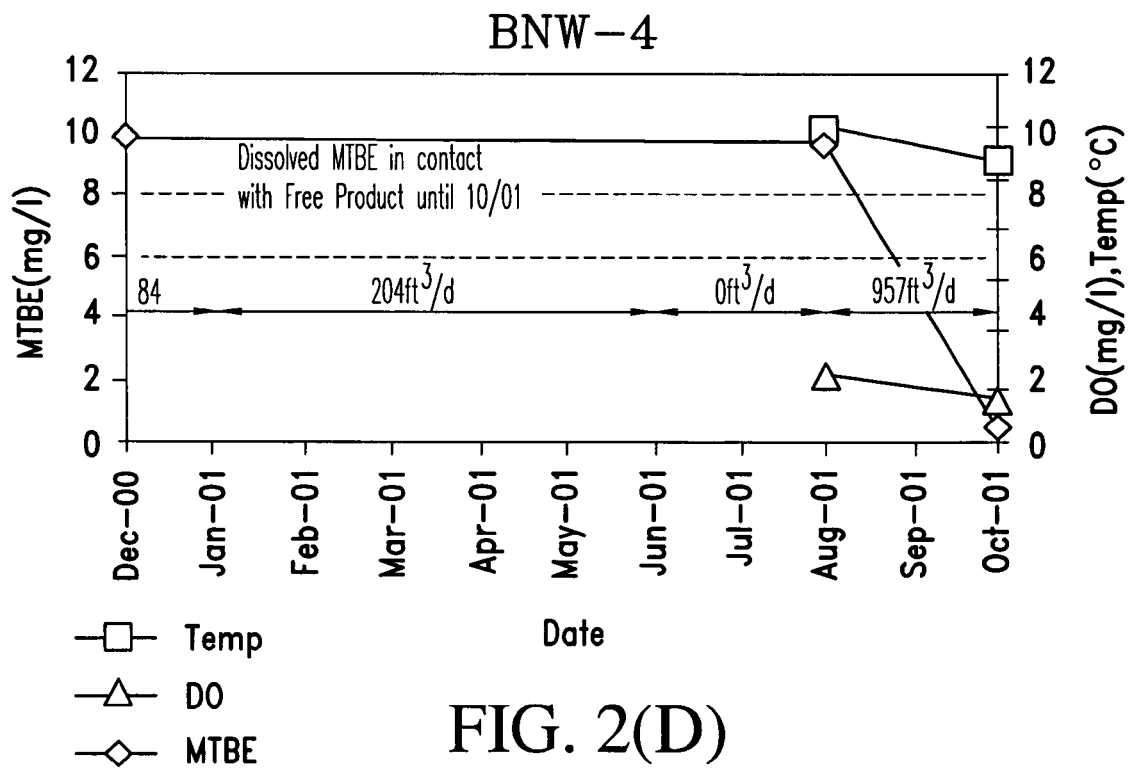

The solid oxygen source (SOS) used in the present invention is, as noted above, sodium percarbonate ($Na_2CO_3 \cdot 1.5H_2O$) coated with polyvinylidine chloride (PVDC) in the form of a granular material, preferably −2.36 mm. These granular particles or "mircocapsules" preferably have an average diameter within a range of 0.25 to 2.0 mm and more preferably within a range of 0.425 to 0.85 mm. Most preferably, all of the microcapsules are within the 0.25 to 2.0 mm range.

A suitable wall to core weight ratio for the microcapsules is 40:60 to 60:40, preferably, about 1:1 for those formed in the manner described below under the heading "Experimental." Thinner walls produced in that manner have been found to release oxygen too quickly. However, sealing processes other than microencapsulation in the manner described below under the heading "Experimental" would allow use of a thinner wall, i.e., a lower wall to core ratio. Thus, the ratio of PVDC wall to sodium percarbonate core may suitably be within the range of about 0.1:1.0 to about 20:1.

The SOS may suitably be used in any amount and is not critical. However, it will typically be 0.1-10% by weight of the slurry, preferably about 1%.

The coated SOS contains about 6.5 wt. % hydrogen peroxide.

Recent studies have shown that, quite unexpectedly the PVDC microencapsulated sodium percarbonate has a shelf life of at least 6 years.

PVDC is used as the encapsulating or sealing polymer because it is nonreactive with the sodium percarbonate and inert in the soil. Unencapsulated sodium percarbonate releases oxygen about 40% faster than the −2.36 PVDC microencapsulated sodium percarbonate with a 1:1 wall to core weight ratio.

Proppant

The term "proppant" originated in the petroleum industry as a name for any particulate solid used in the hydraulic fracturing of rock and/or earth formations and serving to prop open the minute cracks formed by the hydraulic pressure. As used herein the proppant may be sand or any agent conventionally used as a proppant in the petroleum industry. Particularly suited for use as a proppant in the present invention is a proprietary, kiln-fired diatomaceous earth marketed as ISOLITE® (registered trademark of Isolite Insulating Products Co., Ltd. of Osaka, Japan). The proppant may be used in amounts of 1:1 to 10:1, preferably, about 5:1 proppant:SOS.

Microorganism

Any strain of aerobic bacteria known to digest MTBE and/or BTEX or other hydrocarbons and ethers may be used in the present invention. Preferably, the microorganism is PM1 inoculated into the kiln-fired diatomaceous earth prior to injection. PM1 is a strain of *Pseudomonas* known to biodegrade MTBE, as described by Hristova et al, "Detection and Quantification of Methyl tert-butyl ether-degrading Strain PM1 By Real-time TaqMan PCR", *Appl. Envn. Microbioal.* 67:5154-5160 (2001), the teachings of which are incorporated herein by reference. Also see Hanson et al, "Biodegradation of Methyl tert-butyl Ether by a Bacterial Pure Culture", *Appl. Environ. Microbiol.* 65:4788-4792 (1999), the teachings of which are also incorporated herein by reference. Aerobic bacteria strains which are MTBE degraders are also known to occur naturally.

EXPERIMENTAL

Preparation of SOS by Microencapsulation

Sodium percarbonate was obtained from Fluka Chemicals (Ronkonkoma, N.Y.). Microencapsulation was performed by the R. T. Dodge Co. (Dayton, Ohio). Poly(vinylidene chloride) (PVDC, as SERFENE 121) was used as the wall material and was obtained from Morton International (Danvers, Mass.) as a preparation of 50% solids in water. It was further diluted to 30% solids in water. Sodium percarbonate was loaded into the 28-cm bed of a Wurster coater (Coating Place, Verona, Wis.) and the air inflow rate adjusted to the point that the compound was fluidized. The PVDC was sprayed in at a rate of 50 to 60 g/min. The final encapsulated product was 50% PVDC (as wall) and 50% (w/w) sodium percarbonate. Thus, 6.5% of the final product was hydrogen peroxide. The coated product was left in the Wurster until dry and then sieved through a 2.36-mm sieve to remove any coarse material. The grain size analysis of the final product was determined using ASTM Method D1140-54.

Site Description

George's British Petroleum Store is located on Highway 93 South in Ronan, Mont., within the boundaries of the Flathead Indian Reservation. In April 1994, a leaking 16,000 gallon underground storage tank (UST) was removed. It is estimated that at least 10,000 gallons of product was lost from this tank. Site investigations show that a free product plume is present on groundwater directly west of the tank removal area and has migrated south and west under Highway 93. A 1,500 foot long dissolved phase methyl-tertiary butyl ether (MTBE) plume extends south and west from the free product plume under a grain field to a creek. The study area was in the alfalfa field, approximately 300 feet south and west of the source, in the dissolved phase MTBE plume. Free product recovery is occurring on site and levels have been reduced from over five feet to less than two feet in five years. An air sparge interceptor trench is in place immediately upgradient of the study area.

Objectives

The experiments reported here were for the purpose of investigating the effectiveness of in situ bioremediation through hydraulic fracturing and emplacement of Isolite (diatomaceous earth) inoculated with PM1 (an aerobic bacteria that degrades MTBE) on MTBE contaminated soil and groundwater. See the aforementioned article by Hanson et al. Air or a solid oxygen source (SOS) in the form of microencapsulated sodium percarbonate was supplied to the fractures to enhance aerobic degradation. Six horizontal fracture sets, consisting of three fractures each (BioNets), and a seventh BioNet consisting of one fracture, were installed in the dissolved phase portion of the plume, west of Highway 93. The effectiveness of this technology on degradation of MTBE at this site was determined by monitoring contaminants and microbial activity at fracture locations in the subsurface soil and in groundwater. Data from four of these BioNet treatment zones is presented in the following.

Design

In October 2000, seven BioNets containing 19 fractures were installed at the study site, at or near the top of the unconfined aquifer at a vertical spacing of approximately two feet apart (FIG. 1). Hydraulic fracturing was utilized as a delivery mechanism to establish favorable in situ bioremediation conditions in the subsurface environment.

Fracturing procedures included: 1) installing a dedicated steel casing fitted with a drive point; 2) dislodging the drive point downward to expose a short section of open hole; 3) cutting a thin notch in the sidewall at the base of the hole for fracture initiation with a horizontal hydraulic high pressure water; 4) injecting solids-laden slurry downhole, which included the fracture material (sand or Isolite, nutrients, inoculum, and/or SOS) to propagate and form the fracture; and 5) monitoring the injection pressure and surface deformation, to deduce fracture shape (Table 1).

TABLE 1

BioNet Components.

| BioNet | Fractures material | amount (ft³) | PM1 Microbe injected (liters) | SOS (ft³) | Estimated Air Flow Rate (ft³/day) October 2000-(Present | | | | | |
|---|---|---|---|---|---|---|---|---|---|---|
| | | | | | October 2000-January 2001 | January 2001-June 2001 | June 2001-August 2001 | August 2001-November 2001 | November 2001-May 2002 | May 2002-July 2002 |
| BN-1 | sand | 8 | 8.6 | 0 | 84 | 204 | 0 | 957 | 0 | 957 |
| | sand | 2 | 8.6 | 0 | 84 | 204 | 0 | 957 | 0 | 957 |
| | sand | 13.3 | 8.6 | 0 | 84 | 204 | 0 | 957 | 0 | 957 |
| BN-2 | Isolite | 7.5 | 5.4 | 1.67 | 0 | 0 | 0 | 957 | 0 | 957 |
| | Isolite | 7 | 5.0 | 1.7 | 0 | 0 | 0 | 957 | 0 | 957 |
| | Isolite | 2.75 | 2.8 | 0.75 | 0 | 0 | 0 | 957 | 0 | 957 |
| BN-3 | Isolite | 16.8 | 8.6 | 0 | 84 | 204 | 0 | 957 | 0 | 957 |
| | Isolite | 17.4 | 8.7 | 0 | 84 | 204 | 0 | 957 | 0 | 957 |
| | Isolite | 5 | 2.9 | 0 | 84 | 204 | 0 | 957 | 0 | 957 |
| BN-4 | Isolite | 10 | 0 | 0 | 84 | 204 | 0 | 957 | 0 | 957 |
| | Isolite | 10 | 0 | 0 | 84 | 204 | 0 | 957 | 0 | 957 |
| | Isolite | 3.5 | 0 | 0 | 84 | 204 | 0 | 957 | 0 | 957 |

After July 2002 the air supply was retrofitted to include a telemetry system for continuous monitoring of flow rates.

Fracture Characteristics

Wellhead injection pressure was monitored continuously during fracturing. The final upward surface displacement caused by opening the aperture of each fracture, a feature called uplift, was monitored and recorded. The presence of the fractures was confirmed by drilling two-foot offsets from fracture centroids (2 to 8 feet). Isolite (CG-1, 1 millimeter) was inoculated prior to injection with microbes and nutrients. Isolite is a porous ceramic material made from diatomaceous earth kiln fired at 1,800 degrees Fahrenheit, with average pore size of 1.4 microns, large surface area (20 m$^2$/gm) and high porosity (74%). Sand fractures included the use of 10-20 Colorado Silica Sand with an effective size of just over 1.0 millimeter and a uniformity coefficient of 1.55. Fracture diameters are estimated to be as large as 35 feet. These values were calculated using the volumes of solids and liquid injected, the maximum uplift during fracture formation, and with confirmatory sampling. BioNet performance was evaluated, in part, by reviewing the influence on groundwater as pressurized air flow was applied to a fracture. Several increased pressure tests, or air sparging tests, indicated that the radius of influence of these BioNet treatment zones is in excess of 25 feet from fracture centers. Nutrient supplements were added at installation (October 2000) and in August 2001. Nutrient levels were evaluated as part of the sampling program. Oxygen was provided as SOS or supplied air at various flow rates. PM1 microbes and SOS were provided at installation only.

Materials and Methods

Ground water samples were collected in BioNet monitoring wells (BNWs) by USEPA Region 8 UST Program personnel using low flow sampling and purging methodology. BNWs were installed within each BioNet, approximately 10 feet downgradient of the fracture centroids. Analytical work was performed following standard USEPA quality assurance/quality control procedures, according to USEPA SW846 protocols.

The MTBE and BTEX quantification analyses were done using USEPA method 8021B and the presence of MTBE and BTEX was confirmed by mass spectrometry using USEPA method 8260. The presence and quantification of PM1 was done using the method referenced in the aforementioned article by Hirstova et al. The quantification of the naturally occurring MTBE degrading bacteria was done as follows: samples were stored at 4° C. until processing; then mixed, split and subsampled; the sample was serially diluted, plated in triplicate, utilizing the Spiral Biotech Autoplate 4000 plater; and plates were incubated for 3 weeks in Coleman Ice Chests at 8° C. with 2×250 ml Erlenmeyer flasks with 1000 mg/1 MTBE solution.

Results and Discussion—MTBE

BioNets 1-4 all showed reductions in MTBE over the study period. Initial concentrations of MTBE in BioNets 2-4 exceeded 10 mg/1. After 10 months of treatment, MTBE concentrations were reduced to less than four mg/1. The degree of degradation seen in the BioNet is related to a combination of confounding site conditions (continued source and free product) and BioNet contents (Table 1).

FIGS. 2(A)-2(D) show that the concentrations of MTBE over time were reduced in the BioNets.

BioNet-1 (sand, air, PM1) showed a marked decrease in MTBE concentrations in the beginning of the study. MTBE concentrations rose from May to August 2001, when air was lacking. MTBE concentrations continued to rise after the addition of air in August 2001. This continued rise in MTBE could be due to the activation of the bacteria by the supplied air, causing the area to be enhanced with bacterial surfactant leading to a desorbing of MTBE from the sand, a fingerprint for biodegradation. Alternatively, iron oxide may have been forming on the sand, clogging the system and reducing its effectiveness.

BioNet-2 (Isolite, SOS, PM1) demonstrated a steady decrease in MTBE concentration with time, probably because it enjoyed a steady supply of oxygen for 10 months due to the SOS. After August 2001, air was added to the SOS to provide additional oxygen and the decrease in MTBE continued.

BioNet-3 (Isolite, air, PM1) behaved similarly to BioNet-1, early on. However, once air was added in August 2001, there was a dramatic decline in MTBE concentrations. A similar decline in DO was also observed, even though the air supply increased dramatically (Table 1). This indicates that the oxygen provided to BioNet-3 since August 2001, is being consumed by the bacteria that in turn are effectively degrading MTBE.

BioNet-4 (Isolite, air, no PM1) showed a decrease in MTBE concentration after August 2001. This is remarkable because the BioNet became saturated with free product that had migrated from the source area, for much of the test period. The addition of air in August 2001 may have helped the PM1 achieve this reduction of MTBE, at least in part, but further data will be required to determine if this trend holds, since the free product has also migrated downgradient.

Table 2 shows the presence of PM1, both at and subsequent to inoculation. BioNets that were inoculated during fracture installation showed a presence of PM1 a year later (except for BN-2 which showed presence for ten months). Where PM1 was not inoculated, it was not found. This also indicates that although BioNets 3 and 4 were not designed to intercept the contaminant plume (i.e. fractures did not overlap) there was no cross contamination of PM1 from BN-3 to BN-4 which was 35 feet away.

TABLE 2

Presence of PM1 vs. BioNets vs. time.

| BioNet | PM1 Microbes Inoculated October 2000 | PMI Microbes Presence (+) Absence (−) | | |
|---|---|---|---|---|
| | | June 2001 | August 2001 | October 2001 |
| BN-1 | Yes | + | + | + |
| BN-2 | Yes | + | + | Not detected |
| BN-3 | Yes | + | + | + |
| BN-4 | No | − | − | − |

Where PM1 was not inoculated, it was not found. This also indicates that although BioNets 3 and 4 were not designed to intercept the contaminant plume (i.e. fractures did not overlap) there was no cross contamination of PM1 from BN-3 to BN-4 which was 35 feet away.

Figure 3:
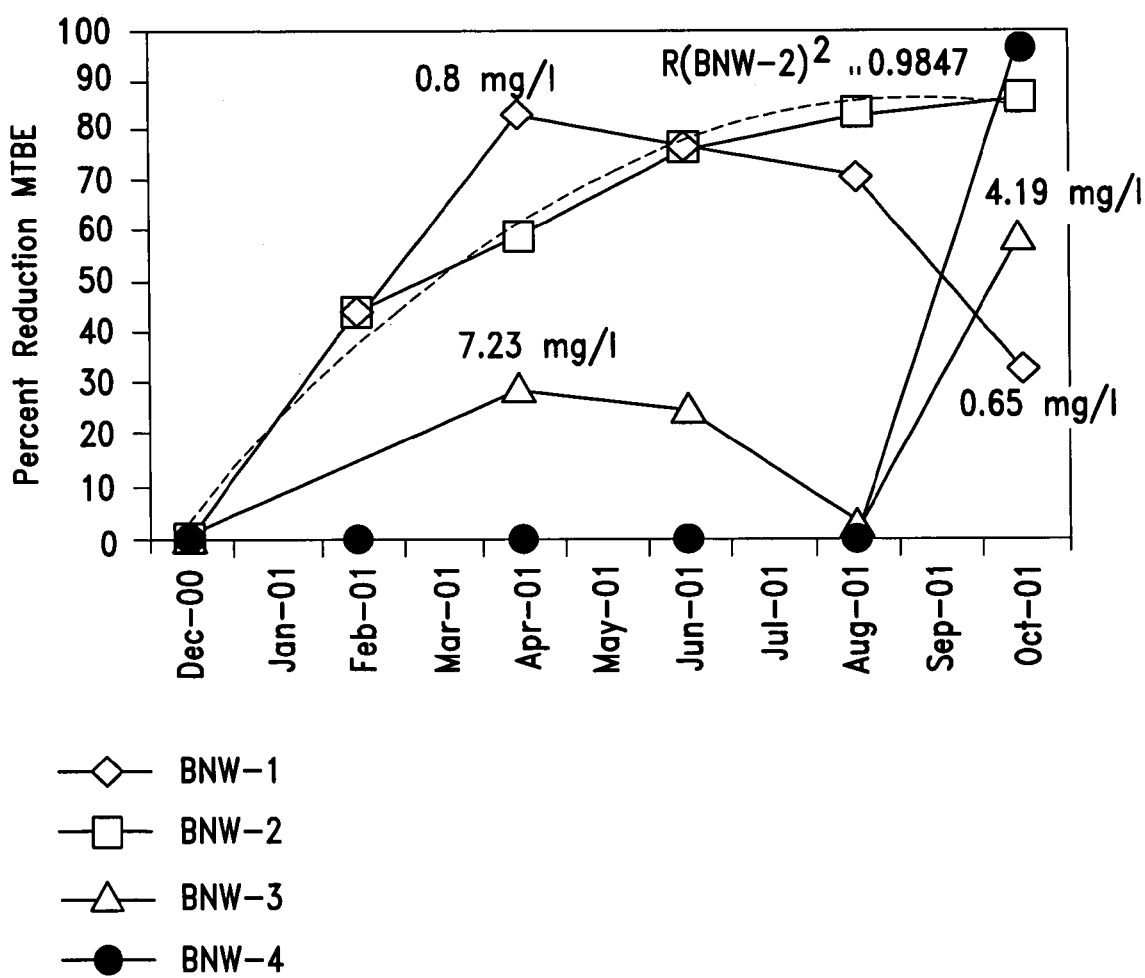
FIG. 3 is a graph of percentage reduction of MTBE at various sampling well sites.
Figure 4A:
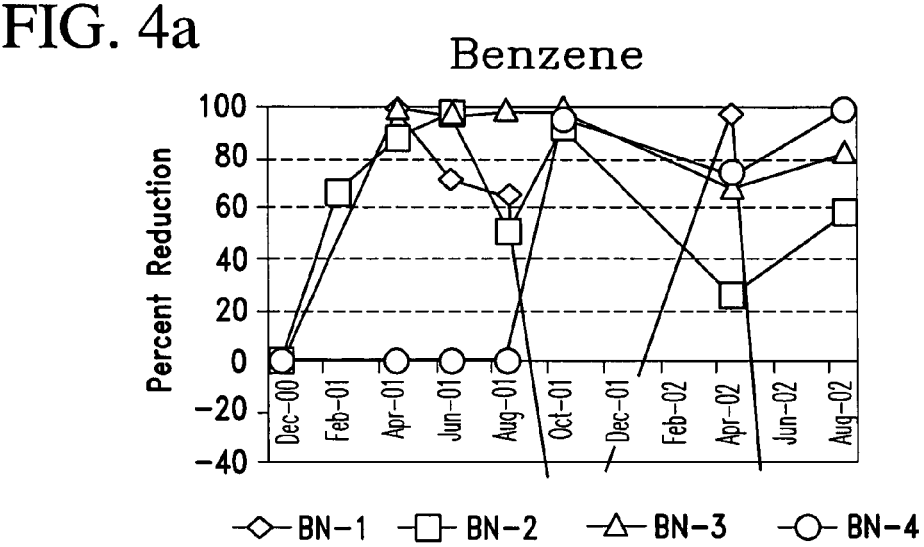
FIGS. 4(A)-4(F) are graphs of BTEX reduction by biodegradation over time as determined experimentally.
Figure 4B:
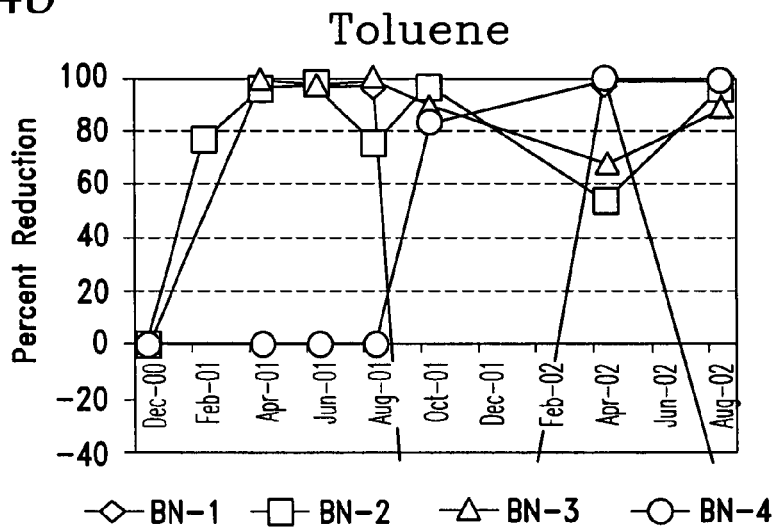
Figure 4C:
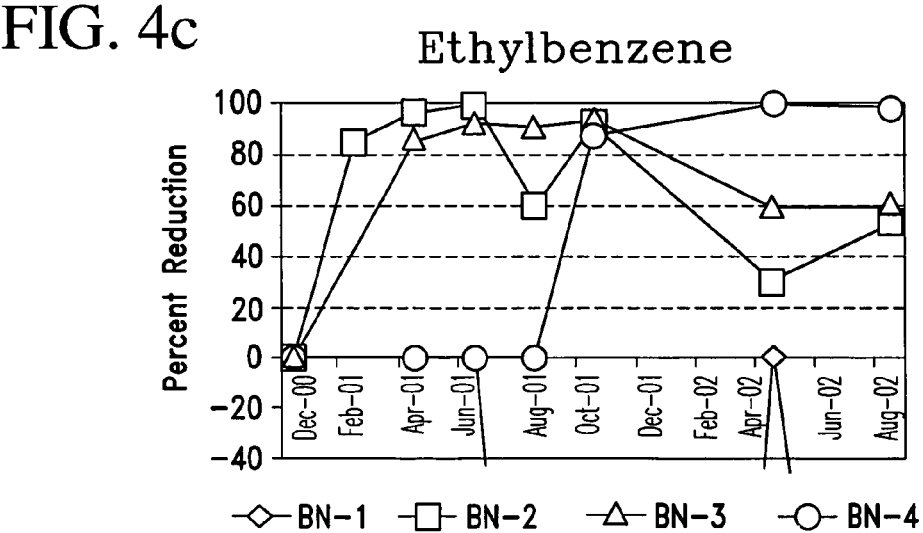
Figure 4D:
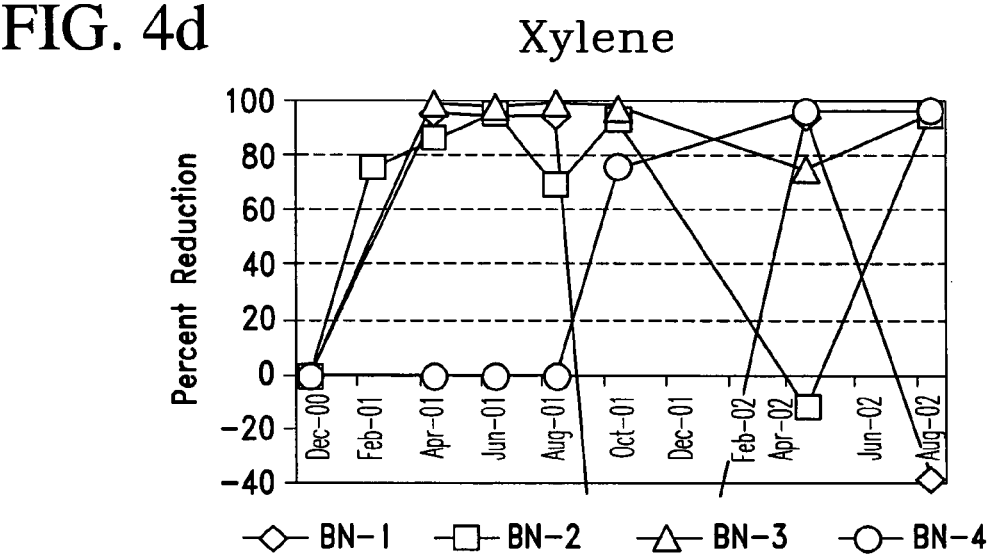
Figure 4E:
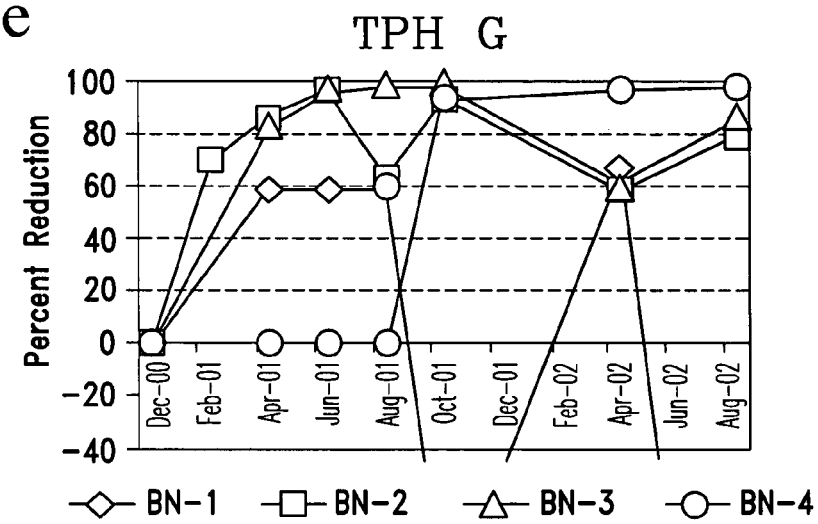
Figure 4F:
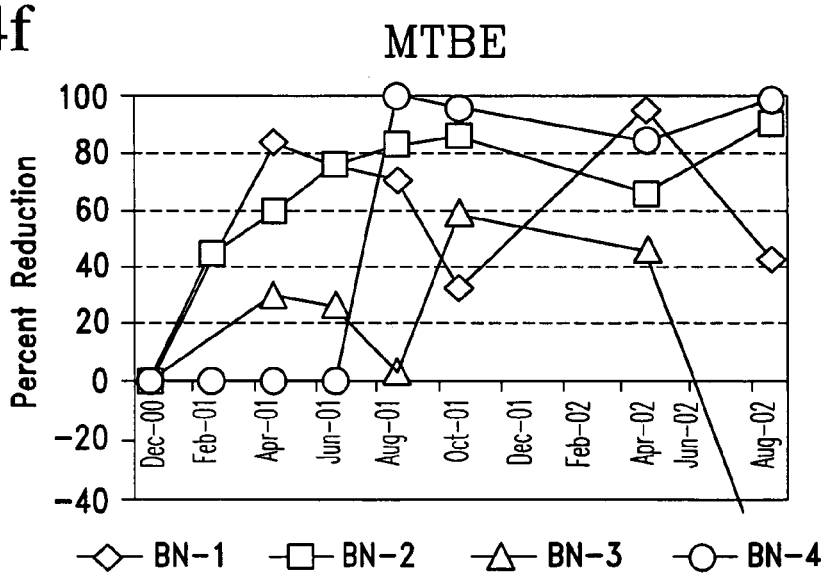

FIG. 3 compares the different treatment conditions by normalizing the MTBE concentrations in each BioNet to the initial concentration on December 2000. See equation 1.

$$\text{Percent Reduction} = \frac{MTBE(\text{December 2000}) - MTBE(\text{new})}{MTBE(\text{December 2000})} * 100 \quad (\text{Eq. 1})$$

The percent reduction of MTBE is higher by almost 30 percent with the SOS in BioNet-2 (BNW-2) than with the air in BioNet-3 (BNW-3). This indicates that the SOS provides a less drastic (and thus less toxic) concentration of oxygen that is very steady. The bacteria thrive better in this environment, i.e., BNW-2 reductions demonstrate a good fit to a polynomial equation ($R^2$=0.9847), which is characteristic of biological reactions. The final additions of air to the SOS after 10 months, appeared to be utilized by the bacteria as a source of oxygen as the reduction of MTBE continued asymptotically.

The presence of PM1 appeared to increase the percent reduction of MTBE (BNW-3 vs. BNW-4) but since Bio-Net-4 (BNW-4) contained free product for most of the study, additional data needs to be collected. When air was supplied to all treatments in August 2001 and after the naturally occurring MTBE degrading bacteria colonized the Isolite in the fractures, the reduction of MTBE was significant. This has been documented in various field studies where the initial inoculation of bacteria, such as PM1, seems to account for quicker reductions of contaminant. This reduction can continue as a result of a native degrading bacterial consortium, which is better suited to the site conditions. In addition, BioNet-4 (BNW-4) data indicate that if bacteria are not inoculated in the field, but air is supplied to the treatment zone (e.g., Isolite fractures), native degrading bacteria will colonize and begin reducing contaminants, but not for a year.

Although initial data show greater percent reduction in MTBE in sand fractures (BNW-1) as compared to Isolite (BNW-3), throughout the study MTBE concentrations at these two locations varied by an order of magnitude. The overall response of these two BioNets was similar until air was reintroduced in August 2001 when a dramatic increase in the percent reduction of MTBE was observed in the Isolite-filled BioNets, indicating that the bacteria are more able to rebound in Isolite than in the sand and possibly that the Isolite is more recalcitrant to surfactant or iron fouling.

Results and Discussion—BTEX

BioNets 1-4 all showed reductions in BTEX over the study period except for ethyl benzene in BN-1. Initial concentrations of benzene up gradient of BioNets 1-4 exceeded 29405 ppb. After 8 months of treatment, benzene concentrations were reduced to less than 600 ppb in Bionets 1-3. The degree of degradation seen in the BioNets is related to a combination of confounding site conditions (continued source and free product) and BioNet contents (Table 1). Bionet 4 was overwhelmed with free product.

FIGS. 4(A)-4(D) show the concentrations of BTEX over time in the various Bio-Nets comparing the different treatment conditions by normalizing the BTEX concentrations in each BioNet to the initial concentration on December 2000. See equation 2.

$$\text{Percent Reduction} = \frac{BTEX(\text{December 2000}) - BTEX(\text{new})}{BTEX(\text{December 2000})} * 100 \quad (\text{Eq. 2})$$

Bio-Net-1 (sand, air, PM1) showed a marked decrease in benzene concentrations in the first 10 months (0 month=September 2000), then an increase at month 12 and month 20 with a decrease in month 18 of the study. A similar pattern can be seen with toluene and xylene. Ethyl benzene saw no reduction in BN-1. These results could be due to initial good growth of degrading organisms on the sand, but when the air supply was compromised in months 7½ to 9½, the culture could not reestablish itself as it did on the Isolite. It has been shown that sand does not have the surface area for bacterial attachment, air space for aeration and contaminant/nutrient interface to the extent that Isolite does. Alternatively, iron oxide may be forming on the sand that could clog the system and reduce its effectiveness.

In BioNet-2 (Isolite, SOS, PM1) for the first 10 months, SOS was the only source of oxygen. Benzene, toluene, ethyl benzene and Xylene were degraded in a very consistent manner. Then air was supplied and the degradation continued but not as predictably, (except for xylene in the 18th month.) After the air addition at the 10th month, BioNet-2 then essentially became a duplicate of BioNet 3 and the degradation of the two followed the same path.

BioNet-3 (Isolite, air, PM1) demonstrated markedly consistent degradation of BTEX over the 22 months for all 4 contaminants.

BioNet-4 (Isolite, air, no PMI) initially showed no BTEX degradation for the first 10 months as it was overwhelmed with free product. At 12 months and on out it showed marked degradation of BTEX despite no initial inoculation.

TPH-G Degradation

Total peterolium hydrocarbon degradation shows the erratic behavior of the sand in BioNet 1, probably due to the loss of air and subsequent problems recultivating the sand. BioNet 4 showed initial non-degradation due to the free product but then responded with close to 100 percent reduction in August 01 when the air was supplied. It didn't even dip as BioNets 2 and 3 did when the air was not supplied. BioNet 2 showed consistent TPH-G degradation with delivery of oxygen with SOS until August 01. (This is interesting as the MTBE degradation showed no laps with SOS.) Then air was supplied to the fractures and BioNet 2 preformed consistent TPH-G degradation with BioNet 3 which had no SOS.

Conclusion

Four in situ bioremediation treatment conditions were evaluated and compared. The largest and most consistent reductions in BTEX concentrations were seen with Isolite, SOS and air supplied fractures. PM1 (which was designed to degrade MTBE) inoculation of fractures is not as important with BTEX degradation. The sand fractures produced good reductions initially (BioNet-1), only to rebound with time, as compared to the Isolite fractures. The Isolite, PM1, and air (BioNet-3) showed better performance with BTEX degradation than MTBE degradation despite an equipment problem, a continuous air supply was not provided and therefore conditions were not optimum throughout the pilot study. The SOS was more reliable than the supplied air at this site, due to site location and lack of serviceability on air supply. PM1 inoculation was beneficial for initial reduction of MTBE compared to the naturally occurring and degrading bacteria, however native bacteria were found colonized in the Bio-Nets with time and seemed to perform very well based on observed reductions. The presence of free product in the uninoculated BioNet-4 fractures, limits our ability to unequivocally determine the effectiveness of naturally occurring bacteria at this site and compare their activity to that of PM1 with MTBE, but with BTEX degradation it is clear than the PM1 inoculation was not necessary.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for biodegradation of hazardous hydrocarbon and/or ether wastes present in subsurface soil, said process comprising:

admixing a proppant, sodium percarbonate coated with polyvinylidine chloride, and water to form a slurry;

injecting the slurry into the subsurface soil at a hydraulic pressure sufficient to form fractures in the subsurface soil, the proppant serving to hold open the fractures; and establishing colonies of bacteria within the fractures, the bacteria having the capability of digesting and degrading the contaminants and the encapsulated sodium percarbonate serving as a solid oxygen source for supplying oxygen to the bacteria; and injecting additional oxygen and/or solid oxygen source into the subsurface soil with an interval of at least ten months between injections.

2. A process according to claim 1 wherein aerobic bacteria are added in forming the slurry.

3. A process according to claim 1 wherein the proppant is inoculated with aerobic bacteria prior to said admixing.

4. A process according to claim 3 wherein the proppant is a porous ceramic granular material obtained by kiln firing diatomaceous earth.

5. A process according to claim 1 wherein said wastes include at least one member selected from the group consisting of methyl t-butyl ether, benzene, toluene, ethylbenzene and xylenes.

6. A process according to claim 5 wherein the proppant is a porous ceramic granular material obtained by kiln firing diatomaceous earth.

7. A process according to claim 6 wherein the porous ceramic granular material is inoculated with the aerobic bacteria prior to said admixing.

8. A process according to claim 7 wherein additional oxygen and/or solid oxygen source is injected into the subsurface soil with an interval of at least twenty months between injections.

9. A process according to claim 1 wherein said wastes are contaminants derived from gasoline and/or diesel fuel.

10. A process according to claim 1 wherein additional oxygen and/or solid oxygen source is injected into the subsurface soil with an interval of at least twenty months between injections.

11. A process according to claim 1 wherein the proppant is a porous ceramic granular material obtained by kiln firing diatomaceous earth.

* * * * *